Dec. 13, 1966     J. C. NORKS     3,290,722
SLITTING DEVICE
Filed Aug. 25, 1964     5 Sheets-Sheet 1
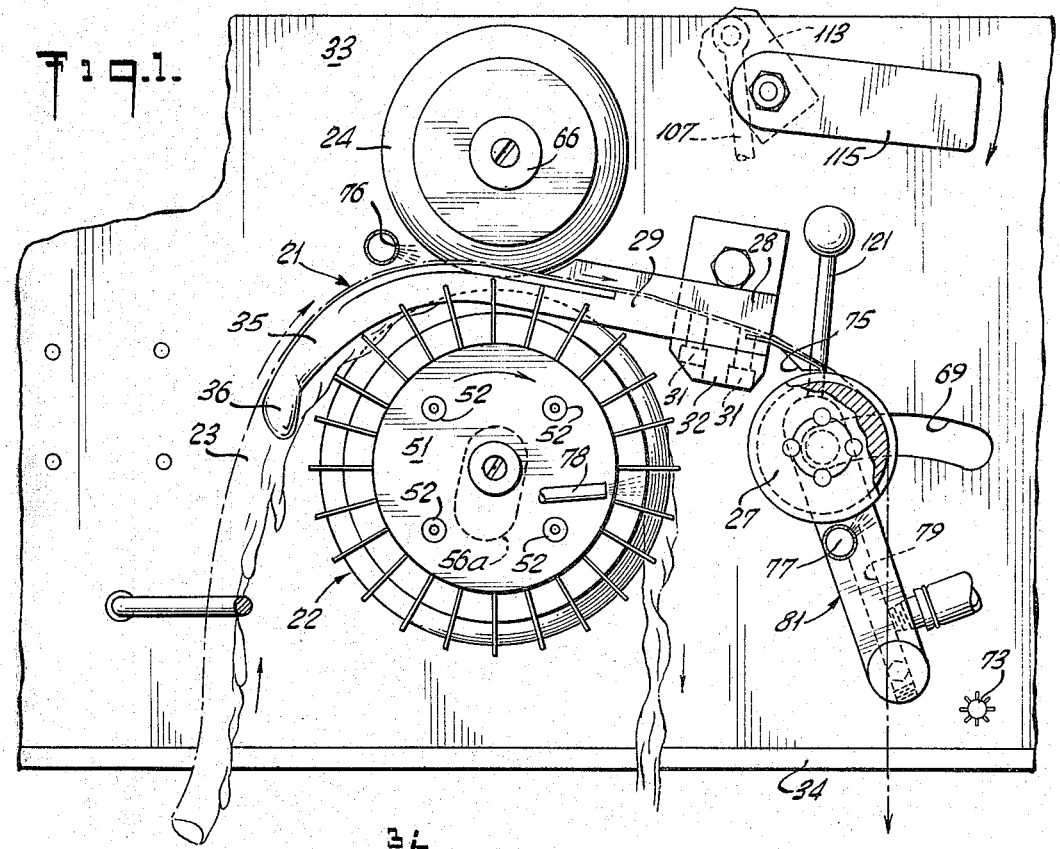
Fig.1.
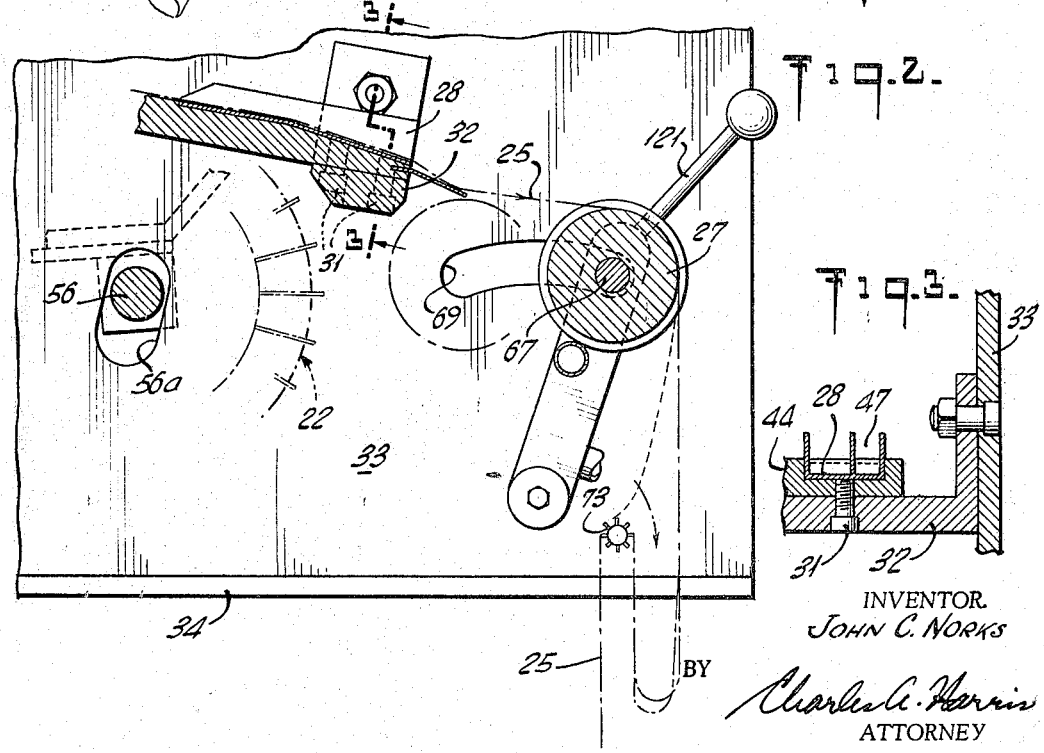
Fig.2.
Fig.3.
INVENTOR.
JOHN C. NORKS
BY
Charles C. Harris
ATTORNEY

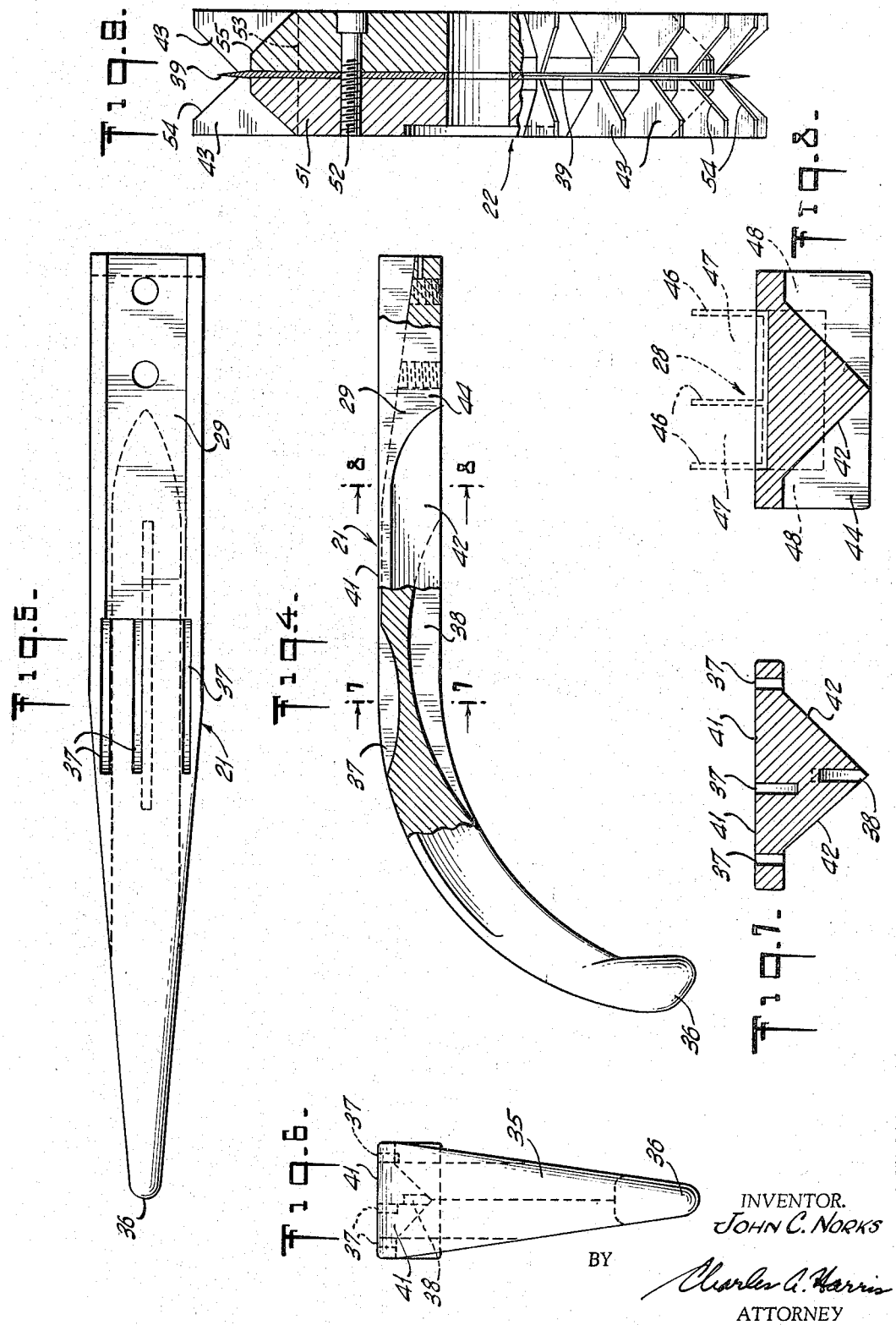

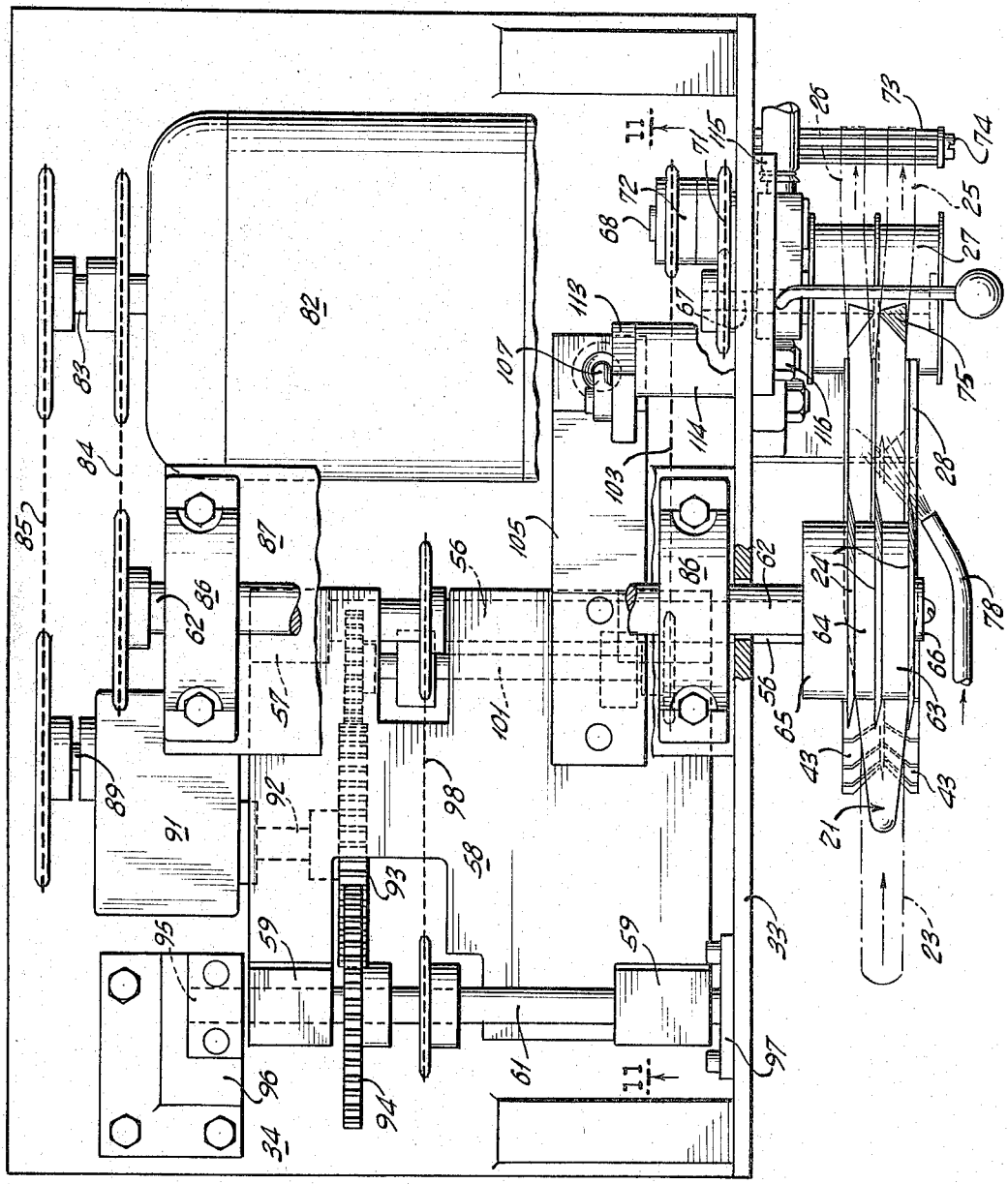

Dec. 13, 1966 J. C. NORKS 3,290,722
SLITTING DEVICE
Filed Aug. 25, 1964 5 Sheets-Sheet 4
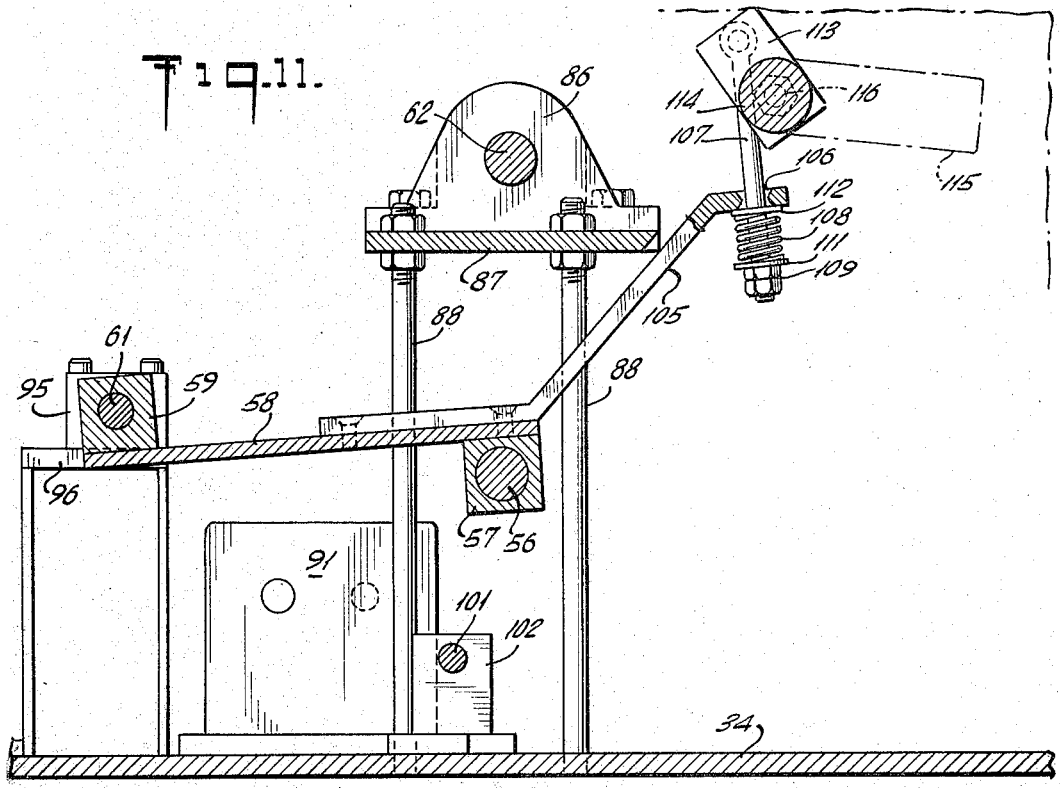
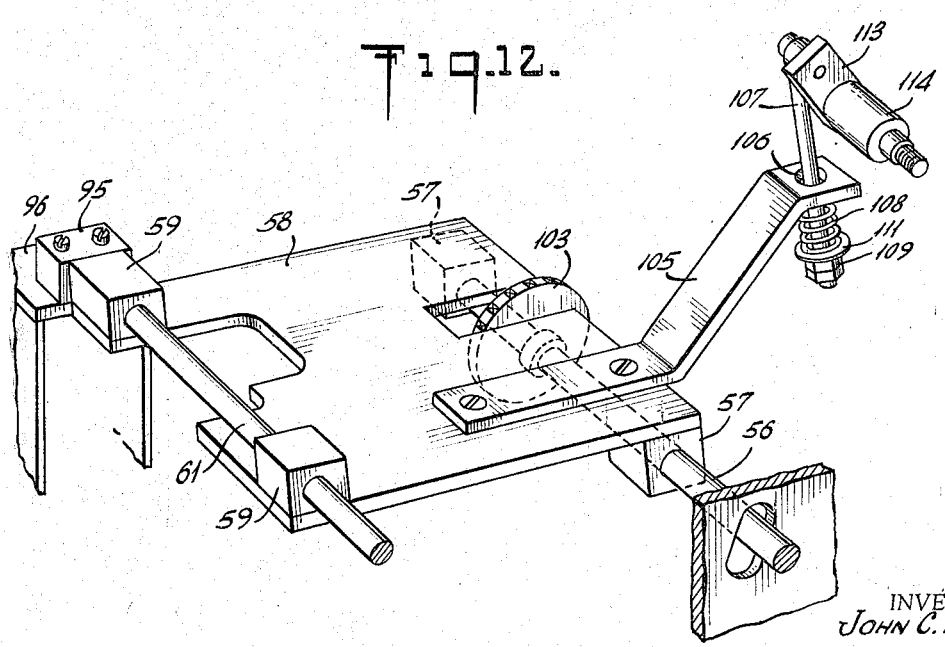
INVENTOR.
JOHN C. NORKS
BY
*Charles C. Harris*
ATTORNEY Dec. 13, 1966  J. C. NORKS  3,290,722
SLITTING DEVICE
Filed Aug. 25, 1964  5 Sheets-Sheet 5
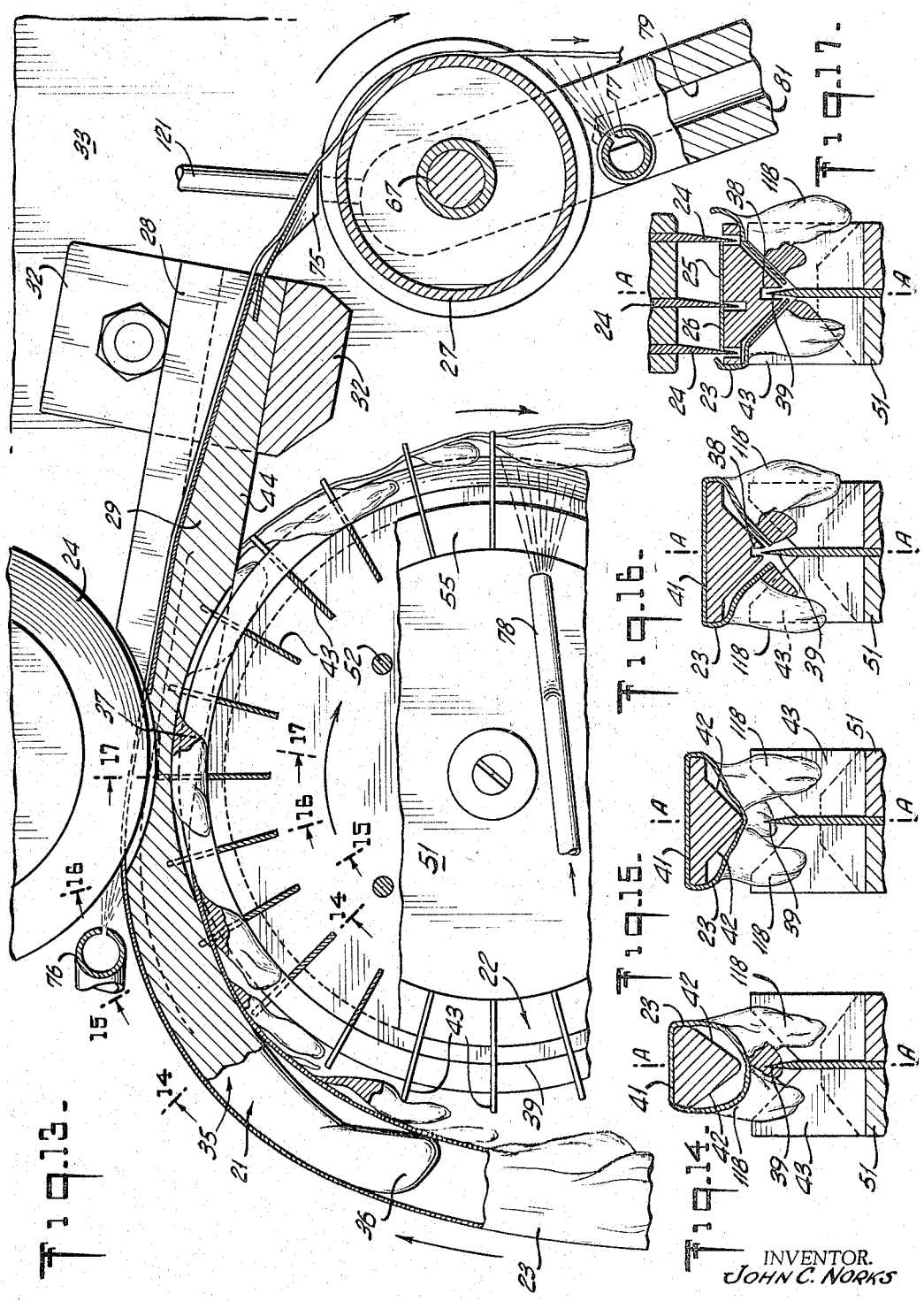
INVENTOR.
JOHN C. NORKS
BY
Charles C. Harris
ATTORNEY

United States Patent Office 3,290,722
Patented Dec. 13, 1966

3,290,722
SLITTING DEVICE
John C. Norks, 237 N. 4th St., Aurora, Ill.
Filed Aug. 25, 1964, Ser. No. 395,640
12 Claims. (Cl. 17—43)

This invention relates to devices for slitting animal intestines, or casings, and more particularly for slitting bovine, or beef, casings to form strips of uniform thickness which will be subjected to further treatment and manufacture to produce strands to be used for surgical sutures and ligatures, racquet strings, and the like.

Heretofore such casings have been slit by drawing them over a mandrel, called a peg, having a leading end which is curved to conform to the naturally coiled configuration of the casing, and slots to accommodate circular slitting knives which slit the casing as it passes over the slots. Casings of this type, and in particular beef casings, possess a relatively fat free and smooth outer surface on the convex side of the intestinal coil, and a fatty external surface on the concave side of the coil. Beef casings, in fact, have such a heavy layer of fat attached to the concave side of the casing that it is uneconomical to process this side to attempt to remove collagenous strands therefrom. Thus, the strips or strands are removed only from the smooth side of beef casings and the peg and slitting knives are designed accordingly.

In prior art devices of this type, the wet, slippery and stretchable casing is drawn over the peg by tension applied by pulling rolls, or the like, to the strips to be slit. In order to assure that the casing is sufficiently distended so that the smooth side of the casing lies flat over the peg for slitting, the peg normally is designed with sufficient girth to stretch the casing somewhat. Thus, while large diameter casings may only be barely filled by the peg, casings of smaller diameter may be stretched substantially transversely in order to pass over the peg. In addition, since tension is applied to the strands to drive the casing over the peg, the strands, or strips, themselves, stretch lengthwise as they are being processed by this technique. While it might seem to be theoretically possible to control the width of the slit strips under these conditions by allowing for the longitudinal and transverse elongation incident to this process, this is not possible in practice because of the differences in size and structural condition among different casings to be processed, and because of variations in diameter, thickness, and the like along the length of individual casings. Furthermore, some casings have a lot more fat on their underside than others and the amount of fat, i.e., the thickness and configuration of the fatty layer also varies along the length of individual casings. As a result, it is virtually impossible to control closely the longitudinal and transverse stretching of the casing as it is drawn over the peg by this technique, and consequently strips of uniform thickness cannot be produced with any regularity from beef casings or other fatty animal casings of this type.

According to the present invention, a device is provided for automatically slitting the smooth side of an animal casing and forming therefrom a strip of uniform width while simultaneously removing the fatty underside of the casing without breaking or damaging the strip. In this device, the casing is driven over the peg without applying substantial longitudinal tension to the strips slit therefrom. In the preferred form of this invention, this is accomplished without stretching the smooth side of the casing substantially in the transverse direction and therefore without applying tension to the strips transversely of the peg as they are being slit. Thus, the production of strips of uniform or constant width is assured.

According to this invention, the casing is positively driven over the peg by a rotating impeller positioned below the peg. The impeller comprises means which normally enter into drivable engagement with the fatty underside of the casing and, in cooperation with a gripping surface or surfaces on the underside of the peg, drive the casing over the peg without applying tension to the smooth side of the casing which rides over the top of the peg. Preferably, a multiplicity of radially extending vanes are spaced angularly from one another about the axis of the impeller for this purpose. Preferably, also, the impeller, itself, is yieldably urged towards the peg and is adjustably mounted so that the force by which the impeller is urged towards the peg may be controlled. By this technique the impeller may be urged towards the peg with sufficient force to assure that it normally drives the casing over the peg as it rotates but is free to turn with respect to the casing if the casing should become jammed on the peg. Furthermore, the pressure on the casing between the impeller and the peg is controlled to assure that while the casing normally is positively driven by the impeller, the casing is yieldably engaged, i.e., free to move with respect to the impeller transversely of the peg.

In the preferred embodiment of this invention, the device is designed to slit casings of varying diameter without substantially stretching the casing transversely of the peg. In this embodiment, the impeller includes a circular splitting blade turning with the impeller in the direction of movement of the casing and located centrally of the peg. In this construction, the gripping means or vanes on the impeller are located on each side of the splitting blade and drive the casing over the peg in the manner described above. The blade and the gripping means on the impeller gradually approach the corresponding gripping surfaces on the peg as the casing is driven over the peg, so that the blade enters into increasing contact with the fatty underside of the casing and, when the casing is stretched taught over the peg, the blade is adapted at least to weaken the underside of the casing to relax the casing before slitting occurs. This assures that the strip removed from the top of the casing is not transversely stretched substantially during slitting. Preferably, in this embodiment the peg defines a bottom recess for receiving the cutting edge of the splitting blade and the blade is adapted to at least partly cut through the underside of the casing before the smooth side of the casing is slit.

It also is preferred that the device of this invention comprise at least three slitting knives in a corresponding number of top recesses in the peg spaced axially from one another for slitting a plurality of strips simultaneously from the smooth side of the casing. The peg defines level guide surfaces between the spaced slitting knives and means is provided in the form of a fluid jet, or the like, for projecting the split strips along the guide surfaces for positively removing them from the knives. In addition, a track or channel structure preferably is provided at each of the guide surfaces for individually guiding the strips away from the slitting area.

In the preferred form of the impeller of this invention the vanes are supported on a central disc portion of the impeller and the external or peripheral surface portions of the disc are spaced a substantially distance radially inwardly of the outermost edges of the vanes to provide spaces between adjacent vanes for accommodating the fat on the underside of the casing. In addition, the impeller structure is shaped to facilitate removal of the fatty waste therefrom.

Other and further advantages of the invention will appear to one skilled in the art from the following description and claims taken together with the drawings wherein:

FIG. 1 is a side view partly in section and partly in elevation of a slitting device according to a preferred embodiment of this invention.

FIG. 2 is a side view partly in section and partly in elevation taken through a portion of the device of FIG. 1 to show the guideway for removing the strips from the slitting knives and the takeoff roll for the strips in a different position from that shown in FIG. 1, with the impeller shown in phantom and other parts of the device removed for the sake of clarity.

FIG. 3 is a view partly in section and partly in elevation taken along the line 3—3 of FIG. 2.

FIG. 4 is an enlarged view partly in section and partly in elevation of the peg of FIG. 1.

FIG. 5 is a top plan view of the peg of FIG. 4 with the curved portion of the peg developed to show its straight length.

FIG. 6 is an elevational view of the leading end of the peg of FIG. 4.

FIG. 7 is a somewhat enlarged sectional view taken along the line 7—7 of FIG. 4.

FIG. 8 is a similarly enlarged view partly in section and partly in elevation taken along the line 8—8 of FIG. 4 and showing the guideway or tracks for removing the strips from the slitting area in phantom.

FIG. 9 is an enlarged end view of the impeller of FIG. 1 partly in elevation and partly in section taken through the axis of the impeller.

FIG. 10 is a partly broken-away top plan view of the device of FIG. 1.

FIG. 11 is a view partly in section and partly in elevation taken along the line 11—11 of FIG. 10.

FIG. 12 is a view in perspective of the adjustable mounting means for the impeller with other parts removed for the sake of clarity.

FIG. 13 is an enlarged view partly in section and partly in elevation showing the main operating parts of the device of this invention and the manner in which they operate to slit strips from a beef casing passing therethrough.

FIG. 14 is a view partly in section and partly in elevation taken along the line 14—14 of FIG. 13 showing the casing as it first passes over the peg and enters into engagement with the vanes on the impeller.

FIG. 15 is a view partly in section and partly in elevation taken along the line 15—15 of FIG. 13 showing the casing as it is driven further along the peg but before it is split by the blade on the impeller.

FIG. 16 is a view partly in section and partly in elevation taken along the line 16—16 of FIG. 13 and showing the casing just after it has been split by the blade on the impeller.

FIG. 17 is a view partly in section and partly in elevation taken approximately along the line 17—17 of FIG. 13 and showing the casing after it has been slit by the knives mounted above the peg and as the splitting blade on the impeller and the slitting knives are close to their maximum penetration with respect to the peg.

Referring to the drawings, there is shown a slitting device according to this invention which comprises an elongated slitting peg 21, a continuously rotating impeller 22 for driving an animal casing 23 over the peg through contact with the fatty underside of the casing, a set of three continuously rotating slitting knives 24 for simultaneously slitting two strips 25 and 26 from the smooth topside of the casing, and a takeoff roller 27 for leading the slit strips away from the guide track 28 mounted on the trailing end of the peg 21.

The peg is secured at its trailing end 29 by machine screws 31 passing through a mounting bracket 32 which, in turn, is bolted to a vertical mounting plate 33 extending upwardly from one side of a horizontal base plate 34, as shown most clearly in FIGS. 1 and 3. The leading half 35 of the peg 21 is curved on a radius corresponding to the average natural radius of the type of casing to be processed so that the casing 23 will tend to assume its natural coiled configuration when passing over the peg with its smooth side riding over the top of the peg and its fatty underside passing under the bottom of the peg, as shown generally in FIG. 1 and in more detail in FIGS. 4 and 13. The trailing half 29 of the peg 21 is substantially straight and the peg is positioned so that this straight section 29 extends rearwardly downward at a slight angle from the horizontal. The peg has a snub nose 36 to assure that it enters the casing smoothly and does not stick to or penetrate the casing wall.

The peg 21 defines a set of three arcuate top recesses 37 spaced axially of the impeller 22 and transversely of the peg to correspond with the axial spacing of the cutting knives 24. The knives 24, in turn, are positioned above the peg in such a way that they enter these top recesses 37 as they rotate. A similar arcuate bottom recess 38 is defined in the bottom of the peg for accommodating a circular splitting blade 39 carried by the impeller 22 and located centrally of the impeller with respect to the axis thereof, as shown in FIG. 9. The girth of the peg 21 gradually increases from the nose 36 of the peg approximately to the point where the curved leading half 35 of the peg joins the straight section 29 thereof until the girth of the peg is sufficient to at least fill the average size casing to be processed. The peg at this point normally will distend the casing somewhat. The top surface 41 of the peg 21 is flat as shown in FIGS. 4–8 and 14–17 and provides a flat guide surface 41, or surfaces, in the nature of an anvil, over which the smooth topside of the casing is drawn flat for slitting. The bottom of the peg, on the other hand, is somewhat triangular in transverse section, as shown in FIGS. 7, 8 and 14–17, and presents gripping surfaces 42 shaped to correspond with the contour of a set of gripping vanes 43 presented by the impeller 22. The gripping surfaces 42 cooperate with these vanes 43 in gripping the fatty underside of the casing 23 and driving the casing over the peg 21, all as will be described more fully hereinafter in connection with FIGS. 13–17. The bottom portion of the peg 21 widens out adjacent the trailing end of the peg to form a mounting portion 44 which is rectangular in cross section, as shown in FIGS. 3 and 8. The peg is recessed somewhat along its longitudinal center line in this area to accommodate the longitudinally extending guide track, or chute, 28 which includes three longitudinally extending and upright walls 46 which together form adjacent longitudinal channels 47 for guiding the slit strips 25 and 26 away from the slitting area. The peg 21 is recessed in such a way that side wall portions 48 thereof extend upwardly on either side of the track 45 for holding the track in position, as shown in FIGS. 3 and 8.

The impeller includes a central disc portion 51 which supports the splitting blade 39 and the gripping vanes 43 thereof. The disc portion 51 is in two halves, one on each side of the splitting blade 39, and is held together by machine screws 52 passing through the blade, as shown in FIG. 9. The gripping vanes 43 extend radially outwardly from the axis of the impeller 22 and are spaced angularly from one another by equal distances about the periphery of the impeller and the axis thereof. The vanes 43 are held in slots 53 correspondingly located around the periphery of the central disc portion 51 of the impeller all at the same radial distance from the axis of the impeller. Each of the vanes 43 has the same shape and consists of two identical half sections, one on each side of the splitting blade 39. The top surface of each vane 43 is inclined upwardly and outwardly away from the splitting blade 39, on each side of the blade, at an angle corresponding to the triangular shape of the bottom of the peg. Thus, the axially extending peripheral edges 54 of the vanes are adapted to conform with the shape of the bottom gripping surface or surfaces 42 on the peg when the splitting blade 39 enters the bottom recess 38 in the peg, as will be described more fully hereinafter. The peripheral surfaces 55 of the disc portions of the impeller are inclined downwardly and outwardly from the splitting blade 39 to facilitate removal of the fatty waste from the impeller and to increase the amount of space between the blades available for accommodating the fat on the underside of the casing. The impeller 22 is keyed to the outer end of an impeller drive shaft 56 which is mounted for rotation in bearing blocks 57 secured to the underside of a pivot plate 58 which, in turn, is pivotally mounted through an additional set of bearing blocks 59 on an intermediate shaft 61 spaced therefrom. The manner in which the impeller shaft 56 and the other parts of this device are driven and connected to a power source will be described more fully hereinafter.

The three circular slitting knives 24 are mounted at one end of a slitter shaft 62 and held in position axially with respect to one another by three cylindrical spacers 63, 64 and 65 and by a washer 66 at the end of the shaft. The two spacers 63 and 64 determine the distance between the cutting edges of the three slitting knives 24. The wider spacer 63 is located between the outermost knife and the intermediate knife and the narrower spacer 64 is located between the innermost knife and the intermediate knife. Thus, the space between the intermediate knife and the outermost knife is greater than that between the intermediate knife and the innermost knife, and the strips 25 and 26 slit by the knives 24 are correspondingly wide and narrow. The other spacer 65 holds the innermost knife in position and thereby acts as a collar for positioning the knives on the slitter shaft 62. As illustrated, in FIG. 10, the knives 24 are centrally located over the longitudinal center line, or axis, of the peg 21 and the splitting blade 39 on the impeller 22. The manner in which the slitter shaft 62 is mounted and driven will be described more fully hereinafter.

The takeoff roll 27 is mounted at the end of a driven takeoff shaft 67 which, in turn, is rotatably mounted at the end of a pivoted lever 70 mounted for pivotal motion on a stub shaft 68 extending through the vertical mounting plate 33. The takeoff shaft 67 also extends through a slot 69 in the vertical mounting plate and is driven through a pulley 71 extending to a driver collar 72 on the stub shaft 68 in a manner which will be described more fully hereinafter. The takeoff roll 27 is intended to lead the slit strips 25 and 26 away from the guide track 28 at the trailing end of the peg 21, and is adapted to be pivoted from a first position shown in FIG. 1, to a second position shown in FIG. 2, to cause the strips to loop over a serrated catching rod 73 which is mounted on the vertical mounting plate 33 by a machine screw 74. An additional deflector 75 is provided at the end of the track 28 for causing the strips to separate slightly transversely from one another to prevent their entanglement as they are led away from the peg 21.

A water jet nozzle 76 is provided just forward of the slitting knives 24 for projecting small streams of water over the guide surfaces 41 between the knives and thereby projecting the strips 25 and 26 along the guide surfaces away from the knives. A similar nozzle 76 is provided underneath the takeoff roller 27 to prevent the slit strips 25 and 26 from curling around the roller. Other water jet projectors 78 are positioned along each side of the impeller 22 at the trailing edge thereof to help free the fatty waste from the splitting blade 39 and the spaces between the vanes 43 on the impeller. Each of these jets is connected to a source of water under pressure, not shown in case of the slitting knife and impeller jets 76 and 78, but shown connected to a passageway 79 in the takeoff lever 81 which extends upwardly to the jet 77 beneath the roller.

The operating parts of the device of this embodiment of the invention are driven from an electric motor 82 mounted on the base plate 34. The motor turns a shaft 83 which transmits power through first and second drive chains 84 and 85 respectively. The first drive chain 84 turns the slitter shaft 62 directly and thereby drives the slitting knives 24. The slitter shaft 62 is mounted for rotation in a pair of upright bearings 86 bolted to opposite ends of a platform 87 supported by four vertical rods 88 screwed in the base plate 34 and bolted to the platform 87. The second drive chain 85 turns a short shaft 89 which enters a gear box 91 which, in turn, drives a gear shaft 92, which has a drive gear 93 fixed on its outer end. The drive gear 93 meshes with an intermediate gear 94 fixed to the intermediate shaft 61 which, as mentioned hereinbefore, turns in the second set of bearing blocks 59 on the pivot plate 58. The ends of the intermediate shaft 61 are mounted in a first bearing block 95 bolted to an upright stanchion 96, and in the second bearing block 97 screwed to the inside surface of the vertical mounting plate 33. These bearings 95 and 97 and the intermediate shaft 61 form a the axis about which the pivot plate 58 turns. The impeller shaft 56 is driven from the intermediate shaft 61 by a pulled drive chain 98 connecting the two shafts.

The drive gear 93 also turns a second intermediate gear 99 and through this second intermediate gear a second intermediate shaft 101 for driving the takeoff roll 27. The second intermediate shaft 101 is mounted in bearing blocks 102 extending upwardly from the base plate 34. The stub shaft 68 is driven from the second intermediate shaft 101 by a pulley 103 connecting the two shafts and, as mentioned hereinbefore, the stub shaft 68 turns a drive chain 71 which drives the takeoff shaft 67.

The impeller 22 is yieldably urged toward the peg 21 by an adjustable support, i.e., the impeller shaft 56 is rotatably mounted on the pivot plate 58 and the pivot plate is mounted for pivotal motion toward and away from the peg 21 and is urged toward the peg by an adjustable spring mounting. To provide for pivotal motion of the impeller assembly, a slot 56a is provided in the vertical mounting plate 33 to allow for vertical displacement of the shaft 56 and the impeller mounted thereon. The spring mounting comprises an S-shaped bracket 105 secured to the pivot plate 58 and having a hole 106 in its outer end for accommodating a rod 107 which, in turn, supports a coil spring 108 which normally urges the S-bracket 105 and the pivot plate 58, carrying the impeller, upwardly towards the peg 21. The rod 107 has a nut 109 threaded on its lower end which holds a washer 111 for compressing the spring 108 against another washer 112 resting against the lower surface of the S-bracket 105, and the amount of compression in the spring 108 is adjusted by raising or lowering the rod 107. For this purpose, the upper end of the rod 107 is pivotably attached to the outer end of a short lever 113 fixed to an adjustable stub shaft 114 which extends through the vertical mounting plate 33 to an adjusting handle 115 which is keyed to the shaft 114. The position of the handle 115 is adjusted to raise or lower the lever 113, and the rod 107 attached thereto, by loosening a nut 116 screwed on the end of the shaft 114 and then tightening the nut 116 when the desired position of the rod 107 is reached.

The operation of this device is best described by reference to FIGS. 13–17. Here a typical beef casing 23 is shown being driven over the peg 21 by the impeller 22 and split along its fatty underside just before it is slit into two strips 25 and 26 of uniform but different widths by the circular cutting knives 24 positioned above the peg. FIGS. 14–16 illustrate the gradually increasing girth of the peg 21 and how the casing 23 gradually is led over the peg and distended somewhat to fit the peg as it passes over the curved leading end 35 thereof. The individual casings 23 are led by hand over the snub nose 36 of the peg until the fat 118 hanging from the underside of the casing is engaged sufficiently by the vanes 43 on the impeller 22 to allow the impeller to drive the casing over the peg. This initial driving engagement of the impeller 22 with the casing 23 is illustrated in FIGS. 14 and 15.

The splitting blade 39 normally begins to enter the fatty side of the casing somewhat as shown in these figures as the casing 23 moves over the curved end 35 of the peg, and continues to approach the peg 21 until it begins to enter the bottom slot 38 in the peg, as shown in FIG. 16, at which point it will cut through the bottom of the casing 23 when the casing is drawn taut over the peg. or at least weaken the underside of the casing. The weakening of the casing 23 by cutting through the fat 118 and penetrating the casing wall, or the actual severing of the casing at this point, is sufficient to relax the casing 23 so that it is not stretched transversely over the top surface of the peg. For this purpose, the impeller 22 only yieldably engages the casing 23 transversely, i.e., so that the underside of the casing is free to move transversely at least to the extent necessary to relax the casing. It will be seen that the space between the axially extending peripheral edges 54 of the vanes 43 and the gripping surfaces 42 on the peg is sufficient to allow for this motion in the position shown in FIG. 16 where splitting is taking place. However, since the vanes 43 have pressed into the fatty layer of the casing, the underside of the casing 23 remains pressed upwardly between the impeller 22 and the peg 21 and therefore remains in position on the peg. Just after the underside of the casing 23 is cut or weakened by the splitting blade 39 to assure that the smooth topside of the casing is relaxed transversely, the casing moves into engagement with the splitting knives 24 and the knives slit the casing as they enter the top recesses 37 in the peg. At this point, the smooth topside of the casing is relaxed, i.e., not stretched, transversely for the reasons just described, and relaxed longitudinally since no longitudinal tension is applied thereto due to the fact that the casing as a whole is driven over the peg 21 only by engagement with the vanes 43 on the impeller 22. The water jets 76 directed between the knives 24 merely serve to project the slit strips 25 and 26 down the track 28 away from the knives and do not apply any substantial tension thereto. The strips 25 and 26 may be allowed to slide off the end of the track 28 where they will be guided over the continuously rotating takeoff roller 27 by the deflectors 75 positioned above the roller 27, or the roller 27 may be moved from the position shown in FIGS. 1 and 13 to the position shown in FIG. 2 by a handle 121 attached to the lever 70 to loop the strips 25 and 26 over the catching rod 73 or lead them into a different collecting basin, or the like, not shown.

Thus, the strips obtained by utilizing the device of this invention in this manner will be smooth and substantially uniform in width, because they were not stretched substantially longitudinally or transversely and because the device is capable of operating without breaking or damaging the strips and without applying any force directly to the strips prior to or during slitting except for the cutting action of the circular slitting knives.

Having now described the invention in specific detail and exemplified the manner in which it may be carried into practice, it will be readily apparant to those skilled in the art that innumerable variations, applications, modifications and extensions of the basic principles involved may be made without departing from its spirit or scope.

I claim:

1. A device for automatically slitting the smooth side of an animal casing and forming therefrom a strip of uniform width while simultaneously removing the fatty underside of the casing without breaking or damaging the strip, which comprises an elongated slitting peg over which the casing is adapted to be drawn with its smooth side up and its fatty side down, said peg having a girth normally adapted to fill said casing, a continuously rotating impeller positioned below said peg and comprising a multiplicity of radially extending vanes spaced angularly from one another about the axis of the impeller, said impeller being yieldably urged towards said peg, a gripping surface on the underside of said peg for cooperating with the vanes on said impeller for normally yieldably engaging the fatty underside of said casing between said vanes and said surface for drawing said casing lengthwise over said peg without substantially stretching the smooth side of the casing in any direction, a plurality of continuously rotating slitting knives above said peg and spaced axially from one another with respect to said peg, said peg defining top recesses for receiving the cutting edges of said knives, said slitting knives being adapted to slit through the smooth side of the casing as the knives enter said top recesses and the casing is being driven over said peg by said impeller, whereby a strip may be severed from said casing without substantially stretching the strip in any direction.

2. A slitting device according to claim 1, wherein the gripping surface on said peg is shaped axially with respect to said impeller to conform with the shape of the axially extending peripheral edges of said vanes.

3. A slitting device according to claim 1, which further comprises means for adjusting the force by which the impeller is urged toward the peg.

4. A slitting device according to claim 1, wherein said impeller comprises a central disc portion supporting said vanes and peripheral surface portions of said disc are spaced substantially radially inwardly of the axially extending peripheral edges of said vanes to provide spaces between adjacent vanes for accommodating the fat on the underside of said casing.

5. A slitting device according to claim 1, wherein the vanes on said impeller follow a circular path which gradually approaches the corresponding gripping surface on said peg and enter into maximum proximity therewith during the slitting of the casing radially outwardly thereof, thereby driving the casing most positively at that time.

6. A device for automatically slitting the smooth side of an animal casing and forming therefrom a strip of uniform width while simultaneously removing the fatty underside of the casing without breaking or damaging the strip, which comprises an elongated slitting peg over which the casing is adapted to be drawn with its smooth side up and its fatty side down, said peg having a girth normally adapted to fill said casing, a continuously rotating impeller positioned below said peg and comprising a circular splitting blade located centrally with respect to the transverse dimension of said peg and means axially located on each side of said splitting knife for normally drivably engaging the fatty underside of said casing for movement lengthwise over said peg while yieldably engaging the casing transversely of the peg, gripping surfaces on the underside of said peg for cooperating with the engaging means on said impeller, a plurality of continuously rotating slitting knives above said peg and spaced axially from one another with respect to said peg, said peg defining top recesses for receiving the cutting edges of said knives and said slitting knives being adapted to slit through the smooth side of the casing as the knives enter said recesses, and said splitting blade when the casing is stretched taut over said peg being adapted at least to weaken the underside of said casing to relax the casing before the knives slit through the casing and thereby assure that the strip removed therefrom is not transversely stretched substantially during slitting.

7. A slitting device according to claim 6, wherein said peg defines a bottom recess for receiving the cutting edge of said splitting blade and said blade is adapted to at least partially cut through the underside of the casing before the knives slit through the casing.

8. A slitting device according to claim 7, wherein the engaging means on said impeller gradually approach the corresponding gripping surfaces on said peg as said splitting blade approaches said bottom recess and enter into maximum proximity with one another when said blade achieves maximum penetration into said bottom recess.

9. A slitting device according to claim 6, wherein the leading end portion of the peg is curved downwardly over the leading side of the impeller on a radius adapted to correspond to the average natural coiled radius of the casing being processed and the periphery of the impeller is curved on a lesser radius.

10. A slitting device according to claim 6, which comprises at least three slitting knives spaced axially from one another and said peg defines a corresponding number of top recesses for receiving said knives, whereby a plurality of strips may be slit simultaneously from the smooth side of the casing.

11. A slitting device according to claim 10, wherein said peg defines level guide surfaces between said knives and means is provided for projecting the slit strips along said guide surfaces for positively removing them from the knives.

12. A slitting device according to claim 11, which comprises channels connected to each of said guide surfaces for individually guiding said strips away from the slitting area.

References Cited by the Examiner

UNITED STATES PATENTS

| 461,804 | 10/1891 | Hoffmann | 17—43 |
| 550,986 | 12/1895 | Lowry | 17—43 |
| 2,920,520 | 1/1960 | Duba | 83—104 |
| 3,037,238 | 6/1962 | Castelow | 17—43 |

FOREIGN PATENTS 244,635  4/1963  Australia.

SAMUEL KOREN, *Primary Examiner.*

LUCIE H. LAUDENSLAGER, *Examiner.*